(12) United States Patent
Hueto

(10) Patent No.: US 7,314,661 B2
(45) Date of Patent: Jan. 1, 2008

(54) SYNTHETIC CLOSURES HAVING IMPROVED PHYSICAL PROPERTIES

(75) Inventor: Ana Hueto, Newcastle, WA (US)

(73) Assignee: Supreme Corq LLC, Kent, WA (US)

( * ) Notice: Subject to any disclaimer, the term of this patent is extended or adjusted under 35 U.S.C. 154(b) by 213 days.

(21) Appl. No.: 11/235,403

(22) Filed: Sep. 26, 2005

(65) Prior Publication Data

US 2007/0071939 A1     Mar. 29, 2007

(51) Int. Cl.
*B32B 5/18*     (2006.01)

(52) U.S. Cl. .......................... 428/71; 428/76; 215/355; 215/358; 215/364

(58) Field of Classification Search .................. 428/71, 428/76; 215/355, 358, 364
See application file for complete search history.

(56) References Cited

U.S. PATENT DOCUMENTS

| | | |
|---|---|---|
| 4,188,457 A | 2/1980 | Throp |
| 4,363,849 A | 12/1982 | Paisley et al. |
| 5,317,047 A * | 5/1994 | Sabate et al. ................. 524/16 |
| 5,480,915 A | 1/1996 | Burns |
| 5,496,862 A | 3/1996 | Burns |
| 5,692,629 A | 12/1997 | Burns |
| 5,710,184 A | 1/1998 | Burns |
| 5,855,287 A | 1/1999 | Burns |
| 5,884,789 A | 3/1999 | Gardner |
| 5,904,965 A | 5/1999 | Noel et al. |
| 6,127,437 A | 10/2000 | Burns |
| 6,179,140 B1 | 1/2001 | Gardner |
| 6,510,957 B2 | 1/2003 | Gilley et al. |
| 2001/0013500 A1 | 8/2001 | Gilley et al. |
| 2003/0146184 A1 | 8/2003 | Gardner et al. |
| 2005/0029692 A1 | 2/2005 | Abe et al. |
| 2005/0031869 A1 | 2/2005 | Fragoia |

FOREIGN PATENT DOCUMENTS

WO     WO 01/02263 A1     1/2001

* cited by examiner

*Primary Examiner*—Alexander S. Thomas
(74) *Attorney, Agent, or Firm*—Thomas E. Loop

(57) ABSTRACT

The synthetic closures disclosed herein are made from novel compositions that comprise a thermoplastic elastomer, polypropylene, a foaming agent, and a plurality of gas-encapsulating thermoplastic microspheres. Without necessarily prescribing to any scientific theory, it is believed that the gas-encapsulating thermoplastic microspheres in combination with the other ingredients provide a feed material especially useful for manufacturing synthetic closures having an appropriate combination of physical properties like, for example, density, oxygen permeability, hardness, extraction or removal force, compression percent recovery (over selected periods of time), and compression force (to compress closure to a smaller diameter).

10 Claims, No Drawings

SYNTHETIC CLOSURES HAVING IMPROVED PHYSICAL PROPERTIES

TECHNICAL FIELD

The present invention relates generally to synthetic closures suitable for removable insertion into a wine bottle, and more specifically, to synthetic closures or bottle stoppers having enhanced structural characteristics and physical properties, including improved oxygen permeability characteristics.

BACKGROUND OF THE INVENTION

Historically, natural cork has been utilized as the primary closure for wine bottles. There are, however, several disadvantages associated with the use of natural cork. For example, natural cork generally has variable properties with respect to, among other things, color, flavor neutrality, shrinkage, expansion, crumbling, ease of insertion, ease of removal, seal formation, and gas permeability. The variability of these properties is undesirable. Moreover, natural cork is susceptible to contamination by various molds which are difficult to eliminate and tend to taint the bottled wine's flavor and aroma.

As a result of the disadvantages associated with natural cork, numerous attempts have been made to develop replacement thermoplastic-based bottle closures. Unfortunately, most development efforts to date have experienced shortcomings, particularly in terms of production cost, product performance, and consumer acceptance. For example, many commercially available synthetic closures have a tendency to noticeably taint bottled wine products.

As way of background, one common type of synthetic closure is disclosed in U.S. Pat. No. 4,363,849 to Paisley et al. This patent discloses the production of synthetic closures having a natural cork-like appearance, wherein the synthetic material is a common polyolefin, such as an ethylene vinyl acetate copolymer (EVA). Similarly, U.S. Pat. No. 4,188,457 to Throp discloses another plastic composition useful for making synthetic closures. The thermoplastic composition disclosed by Throp also comprises an EVA copolymer as a major component. EVA copolymers, however, are undesirable for making synthetic closures because these materials are not able to quickly expand back to its original formed shape after being compressed by, for example, the corker jaws of a bottling machine.

Another type of synthetic closure is disclosed in U.S. Pat. No. 5,904,965 to Noel et al. More specifically, this patent discloses a synthetic closure made by a co-extrusion molding process that produces a continuous rod having a foamed core surrounded by a peripheral non-foamed skin layer. (The formed continuous rod is then cut into smaller cylinders that constitute individual synthetic closures.) A problem associated with this type of synthetic closure, however, is that there is no protective skin layer at either of its ends. As a result, gas permeation through the foamed core is much greater than synthetic closures having protective outer skin layers.

Still another type of synthetic closure is the kind disclosed in U.S. Pat. No. 5,317,047 to Sabate et al. This patent discloses, among other things, a composition useful for making synthetic closures, wherein the composition constitutes a mixture of three principal components; namely, (1) powder and particles of natural cork; (2) expandable plastic microspheres of a methyl methacrylate-acrylonitrile copolymer; and (3) a polyurethane or acrylic binding agent. As disclosed, a selected amount of such a three-part composition is introduced into a cylindrical shaped mold, heat is then rapidly applied in order to expand the plastic microspheres thereby causing the composition to fill the mold, and finally the expanded composition is allowed to slowly cool in order to properly set the binding agent.

The resulting natural/synthetic closure made in accordance with U.S. Pat. No. 5,317,047 to Sabate et al. has many characteristics consistent with that of natural cork; however, it does not possess a protective outer skin like that of many other types of synthetic closures. Because there is no protective outer skin, the resulting synthetic closure suffers from at least three drawbacks. First, the synthetic closure is substantially less durable than a synthetic closure having a protective outer skin (e.g., the pulling action associated with removing the synthetic closure from a bottle using a traditional corkscrew can cause cracking and disintegration that shortens the synthetic closure's useful life). Second, the synthetic closure is more amenable to "scoring" when compressed by the corker jaws of a bottling machine than a synthetic closure encapsulated by a protective outer skin. Finally, and because there is no outer protective skin layer, gas permeation through the natural/synthetic closure is generally greater than synthetic closures having protective outer skin layers.

To date, one of the most successful synthetic closures, which overcomes many of the disadvantages associated with natural cork and other prior art synthetic closures, are the synthetic closures manufactured by Supreme Corq (Kent, Wash. U.S.A.). Specifically, U.S. Pat. Nos. 5,480,915; 5,496,862; 5692,629; 5,710,184; 5,855,287; and 6,127,437 all to Burns and assigned to Supreme Corq (and are all expressly incorporated herein by reference), disclose various synthetic closures for removable insertion into bottles and containers. These synthetic closures are made from formulations that comprise a "thermoplastic elastomer" material, wherein the thermoplastic elastomer preferably comprises a styrene block copolymer. Such synthetic closures generally have an outer skin layer surrounded by a foamed interior, and have proved to be a significant improvement over both natural corks and other types of commercially available synthetic closures.

Although the synthetic closures disclosed in the Supreme Corq patents are superior in many respects as compared to other types of bottle or container closures, technical problems still exist with these and other types of synthetic closures, especially in terms overall performance characteristics. For example, and as noted above, many commercially available synthetic closures have relatively low resistance to oxygen permeation into the container, which can result in oxidation and thus tainting of the wine product. In addition, there is still much room for improvement with respect to having the right combination of physical properties associated with each synthetic closure including, for example, shape (length, width, diameter), weight, density, hardness, insertion force, extraction or removal force, compression force, compression recovery time, cork screw penetration force, and flaking. Accordingly, and while significant advances have been made in the field of synthetic closures for removable insertion into bottles and containers, there is still a need in the art for new and improved synthetic closures and manufacturing processes relating thereto. The present invention fulfills these needs and provides for further related advantages.

SUMMARY OF THE INVENTION

The present invention in one embodiment is directed to a synthetic closure sized and shaped for removable insertion into a wine bottle, wherein the synthetic closure is made from a composition that comprises a thermoplastic elastomer, polypropylene, a foaming agent, and a plurality of gas-encapsulating thermoplastic microspheres. The thermoplastic elastomer can comprise a styrene-ethylene-butylene-styrene (SEBS) block copolymer; the foaming agent can comprise sodium bicarbonate, citric acid and its salts, or a mixture thereof; and the plurality of gas-encapsulating thermoplastic microspheres can comprise an outer thermoplastic shell made from a copolymer of acrylonitrile and methacrylonitrile, and an inner encapsulated gas selected from isooctane, isobutane, or a combination thereof. The synthetic closure includes an outer skin layer surrounding an inner foamed core.

In certain embodiments, the synthetic closure has a length ranging from about 36 mm to about 38 mm, a diameter ranging from about 21 mm to about 22 mm, and an average density ranging from about 0.4 g/cc to about 0.6 g/cc. When inserted within a wine bottle, the synthetic closure preferably has an oxygen permeability ranging from about 0.004 cc/package*day to about 0.008 cc/package*day (ASTM F1307), and a peak extraction force (to remove from the wine bottle) ranging from about 20 kgf to about 30 kgf (ASTM D2200). The outer skin layer generally has a Shore A hardness ranging from about 60 to about 80. In still further embodiments, and when compressed to a smaller diameter of about 15.5 mm (through a Bertolaso semi-automatic bottler), the synthetic closure has a percent recovery of about 97% within about 5 minutes after being compressed. The peak force synthetic closure experiences while being compressed to the smaller diameter of about 15.5 mm ranges from about 80 kgf to about 90 kgf.

These and other aspects of the present invention will become more evident upon reference to the following detailed description. It is to be understood, however, that various changes, alterations, and substitutions can be made to the specific embodiments disclosed herein without departing from their essential spirit and scope. In addition, it is expressly provided that all of the various references and test methods cited herein are incorporated herein by reference in their entireties for all purposes.

DETAILED DESCRIPTION OF THE INVENTION

As noted above, the present invention relates to synthetic closures or bottle stoppers having enhanced internal and external structural characteristics and physical properties, including improved oxygen permeability characteristics. The synthetic closures of the several different embodiments disclosed herein are made from novel compositions that comprise a thermoplastic elastomer, polypropylene, a foaming agent, and a plurality of gas-encapsulating thermoplastic microspheres. Without necessarily prescribing to any scientific theory, it is believed that the gas-encapsulating thermoplastic microspheres in combination with the other ingredients disclosed herein provide a feed material especially useful for manufacturing synthetic closures having an appropriate combination of physical properties like, for example, density, oxygen permeability, hardness, extraction or removal force, compression percent recovery (over selected periods of time), and compression force (needed to compress closure to a smaller diameter for purposes of bottling).

With regards to the novel compositions disclosed herein, the thermoplastic elastomer component can comprise a styrene-ethylene-butylene-styrene (SEBS) block copolymer; the foaming agent component can comprise sodium bicarbonate, citric acid and its salts, or mixtures thereof; and the plurality of gas-encapsulating thermoplastic microspheres can comprise an outer thermoplastic shell made from a copolymer of acrylonitrile and methacrylonitrile, and an inner encapsulated gas selected from isooctane, isobutane, or a combination thereof.

For purposes of clarity, a brief review of polymer nomenclature is provided to aid in the understanding of the present invention. In general, a polymer is a macromolecule (i.e., a long molecular chain) synthetically derived from the polymerization of monomer units or which exists naturally as a macromolecule (but which is still derived from the polymerization of monomer units). The links of the molecular chain are the monomer units. For example, polypropylene is a polymer derived from the monomer propylene ($CH_2=CHCH_3$). More ‡ specifically, polypropylene is a "homopolymer"—that is, a polymer consisting of a single repeating unit, namely, derived from the monomer propylene ($CH_2=CHCH_3$). In contrast, a "copolymer" is a polymer containing two (or more) different monomer units. A copolymer is generally synthesized by the copolymerization of two (or more) different monomers. Such a process yields a copolymer where the two (or more) different monomers are randomly distributed throughout the polymer chain. These copolymers are known as "random copolymers." Alternatively, copolymers can be prepared by the covalent coupling or joining of two homopolymers. For example, the covalent coupling of one homopolymer to the terminus of a second, different homopolymer provides a "block copolymer." A block copolymer containing homopolymer A and homopolymer B can be schematically represented by the following formula: $(A)_x(B)_y$ where $(A)_x$ is a homopolymer consisting of x monomers of A, $(B)_y$ is homopolymer consisting of y monomers of B, and wherein the two homopolymers are joined by a suitable covalent bond or linking spacer group. While the above formula illustrates a block copolymer having two block components (i.e., a "di-block copolymer"), block copolymers can also have three or more block components (e.g., a "tri-block copolymer" schematically represented by the formula $(A)_x(B)_y(A)_x$ or simply A-B-A, as well as a "multiblock copolymer" schematically represented by the formula $(-A-B)_n$).

The thermoplastic elastomer materials (i.e., TPEs) of the present invention are preferably styrene based thermoplastic elastomers. As is appreciated by those skilled in the art, styrene based thermoplastic elastomers can be characterized (unlike conventional single-phase thermoplastic materials) as having one or more copolymers that comprise a major proportion of a soft segment and a minor proportion of a hard segment so as to result in a composition having a two-phase morphology. Because of this unique chemical structure, such segmented thermoplastic elastomers provide for several of the advantages associated with the present invention.

Exemplary of the styrenic thermoplastic elastomers are those sold under the tradename KRATON by Kraton Polymers LLC, United States. More specifically, the thermoplastic elastomer materials of the present invention preferably comprise one or more styrenic block copolymers. More preferably, such styrenic block copolymers include one or more of a styrene-ethylene/butylene-styrene block copolymer (SEBS), a styrene ethylene/propylene-styrene block copolymer (SEPS), a styrene-butadiene-styrene block copolymer (SBS), and a styrene-isoprene-styrene block copolymer (SIS) (e.g., KRATON thermoplastic elastomer compounds). In one preferred embodiment, the thermoplastic elastomer of the present invention comprises a styrene-ethylene/butylene-styrene block copolymer (e.g., Tuftec, Asahi Chemicals, Japan). As is appreciated by those skilled in the art, SBS and SIS are A-B-A type block copolymers having unsaturated elastomeric central segments, whereas SEBS and SEPS are A-B-A type block copolymers having saturated elastomeric central segments. Accordingly, because of their structure, SBS and SIS are more sensitive to oxidation than SEBS and SEPS and are therefore less preferred. The thermoplastic elastomer preferably comprises about 90% to about 92% by weight of the total feedstock.

As noted above, the synthetic closures of the present invention are made from a novel composition that comprises, among other things, polypropylene. As is appreciated by those skilled in the art, polypropylene is a polyolefin which is generally formed by low-pressure polymerization of propylene using an organometallic mixed catalyst (e.g., Ziegler-Natta catalyst); however, polypropylene can be formed by use of a metallocene catalyst. Polypropylene is known to exist in three distinct structures: atactic polypropylene, syndiotactic polypropylene, and isotactic polypropylene. All three structures (and various combinations thereof) are suitable for the various compositions associated with the present invention. The polypropylene component preferably comprises about 2% by weight of the total feedstock.

The novel composition also comprises a plurality of gas-encapsulating thermoplastic microspheres (EXPANCEL 930 MBX 120, Expancel, Sweden and Expancel, Inc., U.S.A.). The microspheres comprise an outer thermoplastic shell made from a copolymer of acrylonitrile and methacrylonitrile, and an inner encapsulated gas selected from isooctane, isobutane, or a combination thereof. When the microspheres are heated, the thermoplastic shell softens and the gas increases its pressure, thereby resulting in an expansion of the spheres. The expanded spheres together with the foaming agent (and in combination with the thermoplastic elastomer and polypropylene) produce synthetic closures that have a unique combination of physical properties. The plurality of gas-encapsulating thermoplastic microspheres preferably comprises about 1% by weight of the total feedstock.

The foaming agent of the present invention is preferably endothermic and therefore comprises sodium bicarbonate, citric acid (and its salts), or mixture thereof (e.g., HYDROCEROL BIH-10E, Clariant Corporation, U.S.A.). As is appreciated by those skilled in the art, chemical blowing or foaming agents are additives which are able to evolve gas, such as $N_2$, or $CO_2$, through chemical reactions that produce foam structures in a polymeric matrix. The foaming agent generally comprises greater than 1% by weight of the total feedstock, and typically comprises a range from about 4% to about 5%.

In order to optimize processability, the various thermoplastic elastomer/polypropylene/microsphere blends of the present invention can be compounded (albeit optionally) to a large extent with other polymers, and can also be compounded with various oils, plasticizers, fillers and extenders, as well as other specialty additives (collectively referred to as processing additives). Indeed, and as appreciated by those skilled in the polymer compounding art, any number of various processing additives such as a colorant can be added to enhance one or more physical characteristics and properties of the synthetic closures disclosed herein.

As is appreciated by those skilled in the art, the compounded ingredients of the present invention can be formed into synthetic closures by conventional injection molding. In this regard, the feed material can be combined with the foaming agent (e.g., using automatic metering and mixing devices mounted directly on an injection molding machine), heated to a suitable temperature, and injected into a mold. In some embodiments, the shape of the mold is that of a cylinder having a height of about 36.5 millimeters or about 44.5 millimeters, and a diameter of about 21.5 millimeters (i.e., dimensions corresponding to that of two types of conventional wine closures). The mold cavity cylinder also preferably has a chamfer or radius at an edge (e.g., a beveled or rounded edge).

In one exemplary synthetic closure manufacturing process, the feed material and foaming agent are allowed to form a mixture, which is generally injected into a cylindrical mold over a period of from about 0.04 to about 1 second. The molding pressure is preferably from about 400 psi to about 700 psi, and further preferably about 575 psi. The molding temperature is preferably from about 350° F. to about 400° F., and further preferably about 375° F. The mixture can generally be maintained in the mold from about 35 to about 60 seconds. The injection molding process is preferably performed as quickly as practicable and with no special venting. After a time period sufficient for the overall composition to effectively harden within the mold, the mold is opened and the formed closure removed. In one embodiment, the mixture can be injected into the mold at a rate and temperature such that the softened or molten mixture randomly coils inside the mold, much like a string being lowered into a bottle, to produce a visible random curling pattern along the surface of the formed closure.

Furthermore, the air in the mold cavity at the beginning of a molding cycle is preferably removed by employing a vacuum assist coordinated with the injection of the mixture. The vacuum assist can be applied for about the last second of the injection period, or it can be first applied after the end of the injection period. Applying the vacuum assist too early in the injection period can result in overly large cell spaces within the formed closure, yielding an overly spongy product. Failure to employ a vacuum assist can result in increased molding cycle times. As is appreciated by those skilled in the art, molding times, pressures, venting, cooling, vacuum assisting, product removal, and other factors relevant to injection molding will be based, to a large extent, upon the precise combination, as well as the type, size and shape of the mold. The synthetic closures of the present invention are preferably manufactured such that they have structural features that allows them, when sealingly engaged within the cylindrical opening of a wine bottle, to be removed with a normal corkscrew using a force of approximately 15 to 35 kgf, and preferably from about 22 to 28 Kgf, and more preferably from about 24 to 26 kgf.

For purposes of illustration and not limitation, the following Example more specifically disclose various aspects of the present invention.

EXAMPLE

In order to better illustrate the effectiveness of the novel compositions associated with the synthetic closures of the present invention, several exemplary synthetic closures were made and tested. The specific materials, methods, and results are more fully set forth below.

A composition was formulated by combining the following components on a weight percent basis: (1) 91.2% of an SEBS-based TPE material (DYNAFLEX, GLS Corporation, U.S.A); (2) 4.8% of a foaming agent (HYDROCEROL); (3) 2.0% of polypropylene (GLS Corporation, U.S.A); (4) 1.0% of colorant (Clariant Corporation, U.S.A.); and (5) 1.0% of expandable microspheres (EXPANCEL 930 MBX 120). The composition was injected into an appropriately sized 16-cavity mold. The resulting cylindrically shaped closures were tested and determined to have the following physical dimensions and properties. First, the lengths of the manufactured closures ranged from about 36 mm to about 38 mm, the diameters ranged from about 21 mm to about 22 mm, and the average densities ranged from about 0.4 g/cc to about 0.6 g/cc. When inserted within a wine bottle, the synthetic closures had oxygen permeabilities that ranged from about 0.004 cc/package*day to about 0.008 cc/package*day (ASTM F1307), and peak extraction forces (to remove from the wine bottle) that ranged from about 20 kgf to about 30 kgf (ASTM D2200). The outer skin layer of the manufactured synthetic closures generally had a Shore A hardness that ranged from about 60 to about 80. When compressed to a smaller diameter of about 15.5 mm (through a Bertolaso semi-automatic bottler), the synthetic closures had a percent recovery of about 97% within about 5 minutes after being compressed, and about 98% within about 24 hours after being compressed. The peak force the synthetic closures experienced while being compressed to the smaller diameter of about 15.5 mm ranged from about 80 kgf to about 90 kgf.

While the present invention has been described in the context of the embodiments illustrated and described herein, the invention can be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing descriptions and all changes that come within the meaning and range of equivalency of the claims are to be embraced within their scope.

What is claimed is:

1. A synthetic closure sized for removable insertion into a wine bottle, wherein the synthetic closure is made from a composition that comprises a thermoplastic elastomer, polypropylene, a plurality of gas-encapsulating thermoplastic microspheres, and a foaming agent, and wherein the synthetic closure includes an outer skin layer surrounding an inner foamed core.

2. The synthetic closure of claim 1 wherein the thermoplastic elastomer comprises a styrene-ethylene-butylene-styrene (SEBS) block copolymer.

3. The synthetic closure of claim 2 wherein the plurality of gas-encapsulating thermoplastic shell made from a copolymer of acrylonitrile and methacrylonitrile, and an inner encapsulated gas selected from isooctane, isobutane, and a combination thereof.

4. The synthetic closure of claim 2 wherein the foaming agent comprises sodium bicarbonate, citric acid and its salts, or mixtures thereof.

5. The synthetic closure of claim 2 having a length ranging from about 36 mm to about 38 mm, a diameter ranging from about 21 mm to about 22 mm, and an average density ranging from about 0.4 g/cc to about 0.6 g/cc.

6. The synthetic closure of claim 5, when inserted within the wine bottle, having an oxygen permeability ranging from about 0.004 cc/package*day to about 0.008 cc/package*day.

7. The synthetic closure of claim 6 wherein the outer skin layer has a Shore A hardness ranging from about 60 to about 80.

8. The synthetic closure of claim 7, when inserted into the wine bottle, having a peak extraction force ranging from about 20 kgf to about 30 kgf.

9. The synthetic closure of claim 8, when compressed to a smaller diameter of about 15.5 mm, having a percent recovery of about 97% within about 5 minutes after being compressed, and about 98% within about 24 hours after being compressed.

10. The synthetic closure of claim 9, while being compressed to the smaller diameter of about 15.5 mm, requires a peak force ranging from about 80 kgf to about 90 kgf.

* * * * *